United States Patent
Graton et al.

[11] Patent Number: 5,732,811
[45] Date of Patent: Mar. 31, 1998

[54] RAM WITH TWO CONTROL CHAMBERS AND A CLUTCH RELEASE BEARING PROVIDED WITH SUCH A RAM

[75] Inventors: Michel Graton, Paris; Frédéric Rey, Saint-Gratien, both of France

[73] Assignee: Valeo, Paris, France

[21] Appl. No.: 714,815

[22] Filed: Sep. 17, 1996

[30] Foreign Application Priority Data

Sep. 19, 1995 [FR] France .................. 95 10940

[51] Int. Cl.[6] .................. F16D 23/14; F16D 25/08
[52] U.S. Cl. .................. 192/85 CA; 192/91 A; 60/583; 60/593; 92/80
[58] Field of Search .................. 192/85 CA, 91 A, 192/98; 92/80; 60/583, 593, 547.1

[56] References Cited

U.S. PATENT DOCUMENTS

| | | | |
|---|---|---|---|
| 3,548,989 | 12/1970 | Root | 192/91 A X |
| 3,912,058 | 10/1975 | Parkins | 192/91 A X |
| 4,650,054 | 3/1987 | Fadler | 192/85 CA |
| 4,979,602 | 12/1990 | Fukushima | 192/85 CA |

FOREIGN PATENT DOCUMENTS

| | | |
|---|---|---|
| 354268 | 2/1990 | European Pat. Off. . |
| 478841 | 4/1992 | European Pat. Off. . |
| 2226579 | 11/1974 | France . |
| 2695685 | 3/1994 | France . |
| 2711398 | 4/1995 | France . |
| 2023252 | 8/1971 | Germany . |
| 3617080 | 11/1987 | Germany . |
| 3-186620 | 8/1991 | Japan . |

*Primary Examiner*—Richard M. Lorence
*Attorney, Agent, or Firm*—Longacre & White

[57] ABSTRACT

The fluid-pressure ram, for controlling a clutch release bearing for an automobile clutch, has two variable-volume control chambers which follow each other axially and comprise a primary chamber which is fed with pressurized fluid and which is axially delimited sealingly, to the front by a fixed base and to the rear by a movable wall integral with a shell, and a secondary chamber which is axially delimited sealingly, to the front by the movable wall and to the rear by the piston, the movements of the fluidtight movable wall bringing about a decantation of a fluid contained in an intermediate chamber to the secondary chamber, and vice versa, the said shell separating the intermediate chamber from the secondary chamber.

7 Claims, 3 Drawing Sheets

RAM WITH TWO CONTROL CHAMBERS AND A CLUTCH RELEASE BEARING PROVIDED WITH SUCH A RAM

FIELD OF THE INVENTION

The invention concerns a fluid-pressure ram and more particularly a fluid-pressure ram, notably for a clutch release bearing control for an automobile diaphragm clutch, of the type in which a variable-volume control chamber is supplied with pressurised fluid in order to control the movement of a piston from front to rear.

BACKGROUND OF THE INVENTION

The use of a hydraulic ram is known for controlling a clutch release bearing.

According to an arrangement known from the document EP-A-0 354 268, the ram, arranged inside the clutch casing, is cylindrical and annular.

The ram is designed to provide the axial movement of the inner radial end of the fingers of the diaphragm, by means of a clutch release bearing, so as to bring about the decoupling of the clutch.

More precisely in this document the fluid-pressure ram, notably for a clutch release bearing control for an automobile diaphragm clutch, includes a piston, an axially oriented cylindrical shell, a movable annular wall, having on its rear face turned towards the piston a first annular portion and a second annular portion, both concentric, and cylindrical, annular and coaxial chambers, namely two variable-volume control chambers which follow each other axially and comprise on the one hand a primary chamber supplied with pressurised fluid in order to control the movement of the piston from front to rear and which is sealingly delimited axially, to the front, by a fixed base and, to the rear, by the said movable wall and, on the other hand, a secondary chamber which is sealingly delimited axially, to the front, by the first annular portion of the rear face of the said movable wall and, to the rear, by the piston, and an intermediate chamber arranged coaxially around the secondary chamber and sealingly delimited, to the front, by the second annular portion of the rear face of the said movable wall, the said secondary chamber and said intermediate chamber being separated radially by the axially oriented cylindrical shell, the said piston sliding inside the secondary chamber.

The axial dimension of this ram is large since it also includes a hydraulic control piston. In addition it cannot have a shaft passing through it.

DISCUSSION OF THE INVENTION

The aim of the invention is to propose a novel design of such a ram which is of minimal axial size compared with the travel of its piston and which can have a shaft pass through it.

For this purpose, the invention proposes a fluid-pressure ram, notably for a clutch release bearing control for an automobile diaphragm clutch, of the type in which a variable-volume control chamber is supplied with pressurised fluid in order to control the movement of a piston from front to rear, wherein the primary control chamber is delimited radially by two axially oriented fixed cylindrical walls, respectively inner and outer, wherein the intermediate chamber is delimited axially, to the rear, by a fixed annular transverse base, wherein the said shell slides axially with the said movable wall and has a front area for connection with the said movable wall which separates the two concentric annular portions of the rear face of the movable wall and which is provided with passages to permit the decantation of the fluid between the intermediate chamber and the secondary chamber, so that movements of the fluidtight movable wall cause variations in volume in the fluidtight intermediate chamber so that an increase in the volume of the primary chamber brings about a decrease in the volume of the intermediate chamber connected to the secondary chamber so that the movements of the movable wall bring about a decantation of the fluid from the intermediate chamber to the secondary chamber, and vice versa.

By virtue of the invention the axial dimension of the ram is reduced simply and reliably. Here the intermediate chamber forms a reservoir which surrounds the secondary chamber. It is for this reason that the base of this chamber is fixed and that the shell is integral with the movable wall.

In the document EP-A-0 354 268, the base of the intermediate chamber consists of a movable piston subjected to the action of return springs and the shell is slidably mounted on a centring device for the movable wall. In this document it is sought to take up wear and the ram cannot have the input shaft of the gearbox pass through it. In addition the piston acts on a clutch release lever associated with the clutch release bearing. The ram according to the present invention can have the input shaft of the gearbox pass through it and act, through its piston, directly on the clutch release bearing.

According to other characteristics of the invention:
- the ram includes an inner tube whose outer cylindrical wall delimits radially towards the inside the primary and secondary chambers, and an axially oriented outer cylindrical body with a cylindrical internal bore which delimits radially towards the outside the primary chamber and the intermediate chamber, and the movable annular wall slides sealingly between the inner tube and the outer cylindrical body;
- the front transverse wall of the primary chamber is produced in one piece with the inner tube;
- the rear transverse wall of the intermediate chamber forming a reservoir is produced in one piece with the outer cylindrical body;
- the piston is annular and slides axially on the inner tube and inside the secondary chamber and bears against a clutch engagement bearing, the movements of which it controls;
- the inner tube has at its rear axial end a radial flange which constitutes an end-of-travel stop for controlling the piston.

The invention also proposes a hydraulically controlled clutch release bearing, wherein movements of the stop are controlled by a ram according to the teachings of the invention.

Naturally the main, intermediate and secondary chambers are preferably pre-filled before the ram is mounted on its fixed part.

BRIEF DESCRIPTION OF THE DRAWINGS

Other characteristics and advantages of the invention will emerge from a reading of the detailed description which follows, for an understanding of which reference will be made to the accompanying drawings in which.

DESCRIPTION OF A PREFERRED EMBODIMENT OF THE INVENTION

Figure 1:
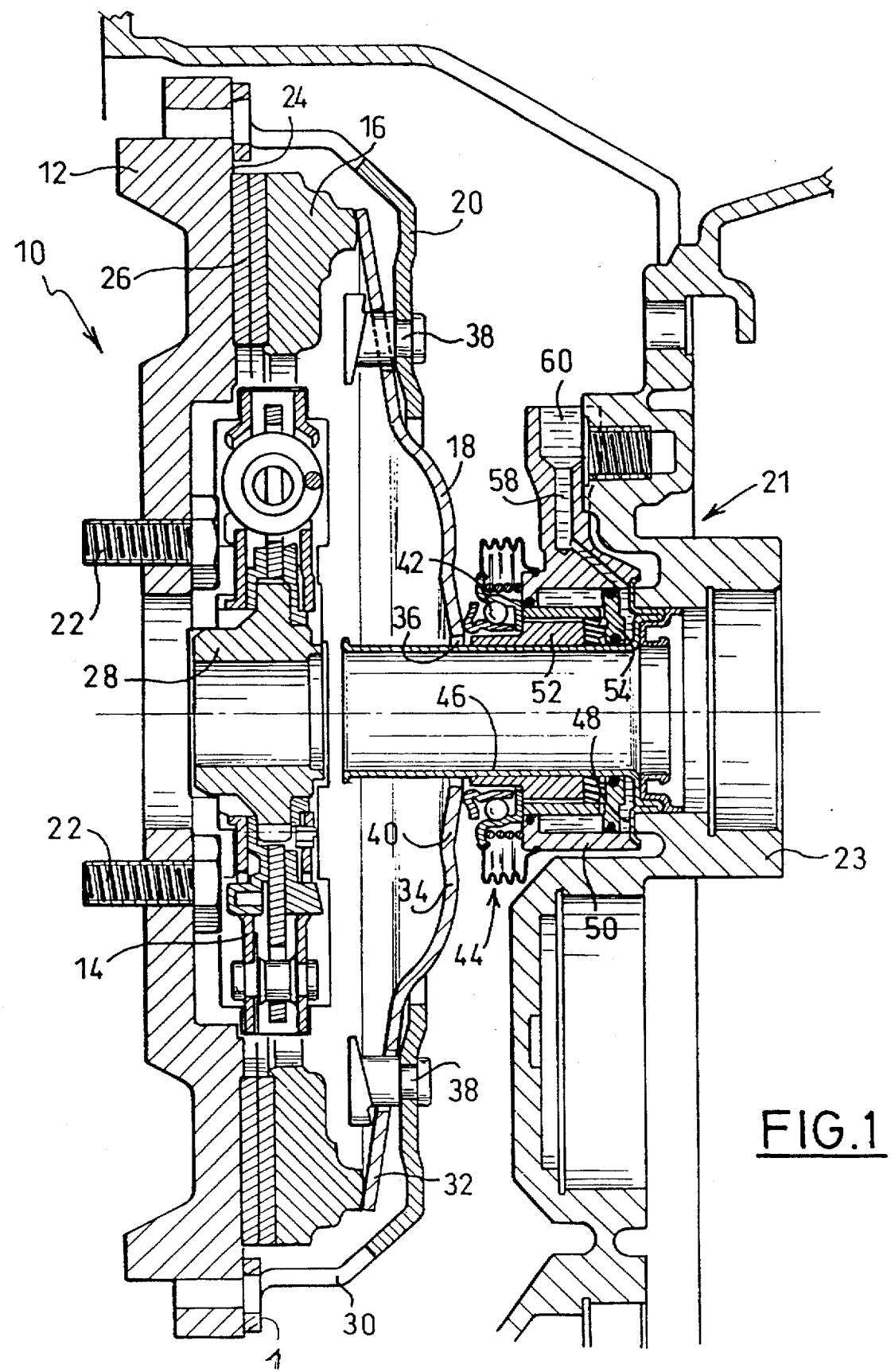
FIG. 1 is a diagrammatic view in partial axial section of an automobile clutch.

FIG. 1 depicts an automobile clutch 10, designed to be interposed between an output shaft (not depicted) of the vehicle engine and the input shaft (not depicted) of a gearbox 21.

This clutch has a reaction plate 12 designed to be fixed by screws 22 to the output shaft of the engine.

More precisely, the clutch 10 includes, arranged in succession axially, a reaction plate 12, a friction disc 14, a thrust plate 16, a diaphragm 18 and a cover 20 designed to cover the entire mechanism.

The friction disc 14 has at its outer periphery friction linings 26 arranged on each of its two faces and which are designed to be clamped between the reaction plate 12 and the thrust plate 16 in order to allow the transmission of the engine torque to the gearbox.

To this end, the friction disc 14 has, at its inner radial periphery, a fluted hub 28 which provides the rotational driving of the input shaft of the gearbox.

The cover 2 is connected with respect to rotation by its outer peripheral edge 30 to the reaction plate 12, here by means of screws (not shown) mounted by means of a radial flange 1 on the cover 20, and it surrounds the linings 26, the thrust plate 16 and the diaphragm 18.

The diaphragm 18 has, in a known manner, an outer peripheral part 32 in the form of a Belleville washer and a central part divided into radial fingers 34 by radial slots opening out internally in the central opening 36 in the diaphragm 18.

The diaphragm 18 has, in the free state, a substantially frusto-conical shape and it bears through its outer peripheral part 32 against the thrust plate 16 so as to axially force the said pressure disc 16 in the direction of the reaction plate 12, bearing against the cover 20 in order to clamp the friction linings 26 between the plates 12, 16.

Small columns 38 are fixed to the cover 20 and form tilting bearing points on a circle of the diaphragm 18 so that, when the inner radial end 40 of the fingers 34 is forced axially from right to left as seen in the figures (that is to say from front to rear) by a ball-bearing clutch release bearing 42, the diaphragm is deformed (tilts) so that its outer periphery 32 is lifted away from the thrust plate 16 by lever effect.

The friction disc 14 is then free to slide axially on the input shaft of the gearbox in order to interrupt any contact of the drive shaft with the reaction plate 12.

Figure 2:
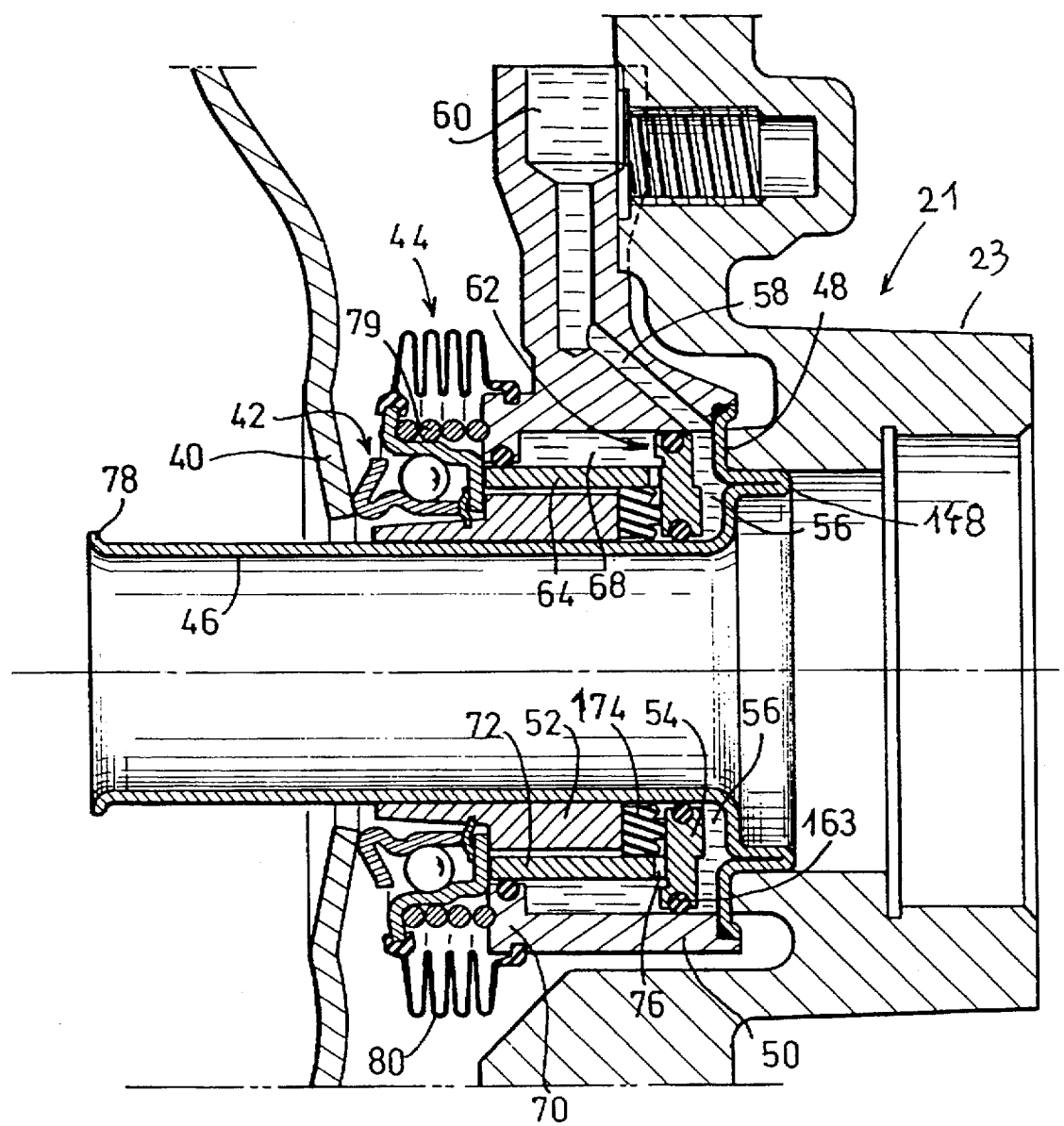
FIG. 2 is an enlarged view of FIG. 1 depicting more particularly the ram controlling the clutch release bearing, in the engaged position of the clutch.
Figure 3:
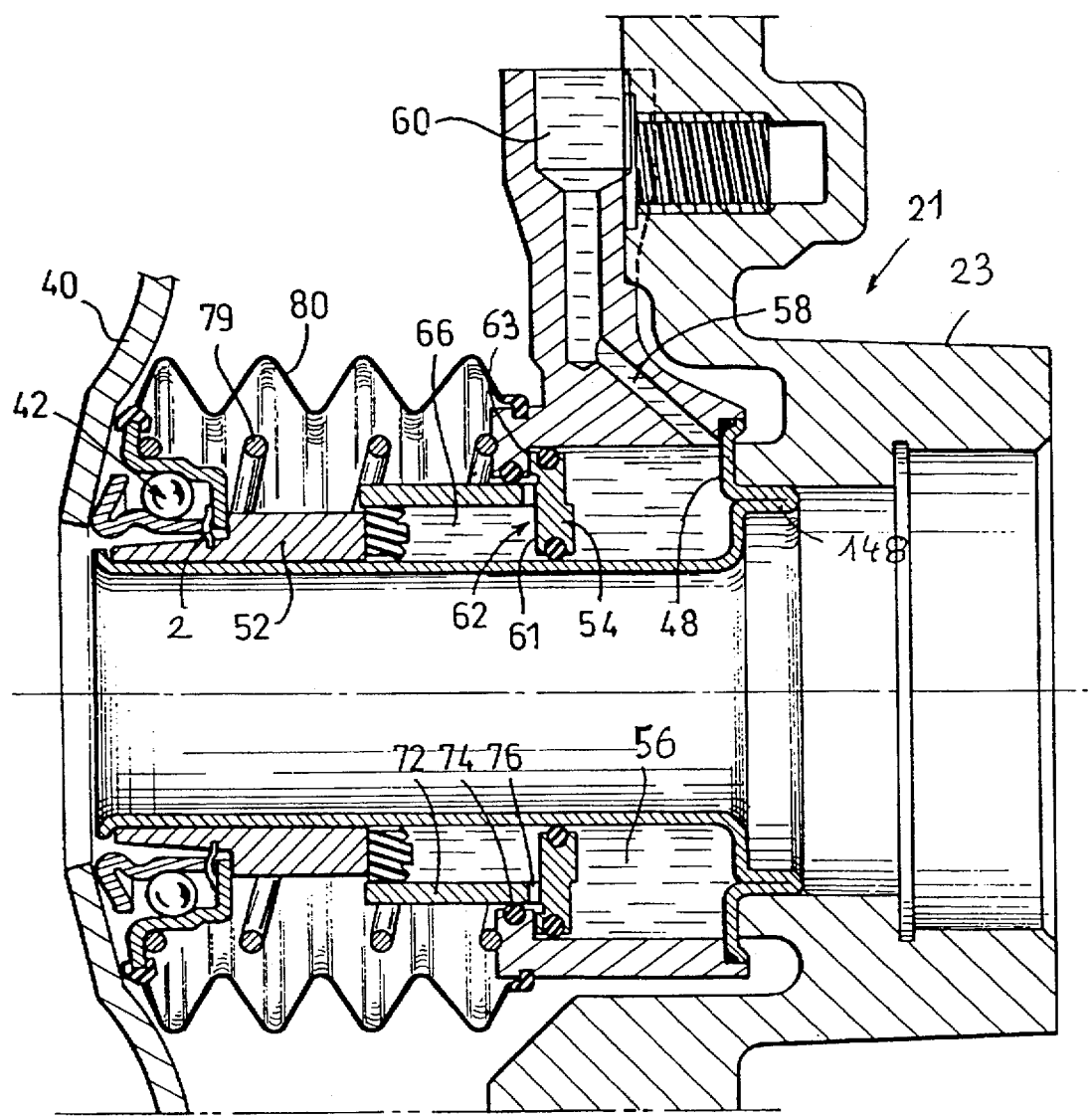
FIG. 3 is a view similar to that of FIG. 2 in which the clutch is depicted in the disengaged position.

FIGS. 2 and 3 depict in more detail the hydraulic device controlling the movements of the clutch release bearing 42 which is arranged coaxially around the input shaft of the gearbox in front of the diaphragm 18, that is to say to the right thereof in the figures.

The hydraulic device controlling the movements of the bearing 42 is produced in the form of a hydraulic ram 44 of the concentric type with the input shaft of the gearbox passing through it.

The ram 44 has an inner tube 46 which is provided at its front axial end with a radial flange 48 with an axial fold 148 for centring it in the internal bore of a bearing 25 of the gearbox 21.

The ram 44 also has a cylindrically hollow outer cylindrical body 50 and a piston 52, here tubular in shape, which is in abutment against the ball bearing 42 and which controls the movements thereof. The piston 52 here carries the bearing 42 and slides axially on the inner tube 46 inside a secondary chamber 66 described below.

According to a first aspect of the invention, the ram 44 also has an annular movable wall 54 which delimits axially with the front radial flange 48 a primary hydraulic chamber 56 which extends radially between the inner tube 46 and the outer cylindrical body 50. This body 50 is tubular in shape overall.

Thus the primary chamber 56 is delimited radially by two axially oriented fixed cylindrical walls, namely the outer body 50 and the inner tube 46, both concentric.

In a known manner, the outer cylindrical body 50 has a supply channel 58 which opens out into the primary chamber 56 and which enables the latter to communicate with an inlet 60 for pressurised control fluid, such as oil, coming from a transmitter such as a master cylinder.

The movable annular wall 54 is oriented transversely and has on its rear face 62, turned towards the piston 52, a cylindrical shell 64 which extends axially from the movable wall 54 towards the rear, that is to say towards the left in the figures.

The cylindrical shell 64, tubular in shape, has an average radius lying between the radius of the inner tube 46 and that of the outer cylindrical body 50 so that the cylindrical shell 64 delimits between them two concentric annular cylindrical chambers 66, 68, delimited axially towards the front by two concentric annular portions 61 and 63 of the rear face 62 of the movable wall 54 which are separated by the cylindrical shell 64.

One of these chambers, referred to as the secondary chamber 66 within the meaning of the invention, is delimited radially by the inner tube 46 (by the outer cylindrical wall thereof) and by the shell 64, and axially, to the front, by the movable wall 54 and, to the rear, by the annular cylindrical piston 52 which is free to slide axially in a fluidtight manner between the inner tube 46 and the shell 64, as a function of variations in volume of the secondary chamber 66.

As can be seen more particularly in FIG. 2, the other one of the chambers 66, 68, referred to as the intermediate chamber 68, is delimited radially by the cylindrical shell 64 and by the cylindrical body 50 (by the cylindrical internal bore thereof), and axially, to the front, by the movable wall 54 and to the rear by a transverse base 70 which is produced in one piece with the cylindrical body 50 and which has an orifice for guiding the outer cylindrical surface 72 of the cylindrical shell 64.

A sealing joint 74 is arranged between the transverse base 70 and the outer surface 72 of the cylindrical shell 64 so as to ensure fluidtightness of the outer secondary chamber 68. The chambers 66, 68 and 56 are cylindrical, annular and coaxial. The ram 44 is therefore of the concentric type since it is adapted to have the input shaft of the gearbox pass through it. In addition, the body 50 and tube 46 are mounted coaxially so as to define the aforementioned chambers 66, 68, 56. The body 50 and tube 46 belong to the fixed part of the ram. It will be noted that the three chambers 56, 66, 68 have a variable volume, that the intermediate chamber 68 is arranged coaxially around the secondary chamber 66 and that the primary 56 and secondary 66 chambers are delimited radially towards the inside by the outer wall of the tube 46, whilst the intermediate 68 and primary 56 chambers are delimited radially towards the outside by the internal bore of the body 56.

According to another characteristic of the invention, communication orifices 76 are provided which are arranged in front of the cylindrical shell 64, at the level of its connection with the movable wall 54.

These communication orifices 76, here of transverse orientation, are regularly distributed over the entire periphery of the shell 64 and thus enable a fluid to pass freely from the intermediate chamber 68 to the secondary control chamber 66, and vice versa, whatever the relative axial position of the components. Here the shell 64 is integral with the movable wall 54 whilst being made in one piece with it.

As can be seen in FIG. 2, when the clutch engagement bearing 42 is in the axially retracted position, that is to say when the diaphragm 18 is free to force the thrust plate 16 in the direction of the reaction plate 12 in order to provide the engagement of the engine and gearbox, the movable wall 54 and the piston 52 of the ram 44 are forced by the diaphragm 18 towards their extreme retracted position in which the volumes of the primary chamber 56 and secondary chamber 66 are at their minimum, whilst the volume of the intermediate chamber 68 is at its maximum in order to form a reserve of fluid whose purpose will be explained subsequently.

When it is desired to disengage the coupling of the engine and gearbox, it is a question of bringing about the axial movement towards the rear of the clutch engagement bearing 42, which then forces the inner radial end 40 of the radial fingers 34 of the diaphragm 18 so that, by lever effect about tilting support points formed by the small columns 38, the outer peripheral part 32 of the diaphragm 18 is lifted away from the pressure plate 16 in order to interrupt the transmission by friction of the torque between the reaction plate 12 and the friction disc 14.

To this end, a device (not shown) for supplying pressurised fluid injects, through the supply inlet 60 and the supply channel 58, pressurised fluid (gaseous or liquid in nature) into the primary chamber 56 and thus brings about a movement of the movable wall 54 and cylindrical shell 64 axially towards the rear.

The movement of the movable wall 54, here axially towards the rear, has the effect of reducing the volume of the intermediate chamber 68 forming a reserve and it consequently tends to cause the decantation of the fluid which was initially contained in the intermediate chamber 68 towards the second chamber 66, through the communication orifices 76.

In this way, an axial movement towards the rear of the movable wall 54 causes an axial movement towards the rear of the piston which is due on the one hand to the movement of the movable wall 54 and on the other hand to the increase in volume of the secondary chamber 66 caused by the arrival of the fluid through the supply orifices 76.

Thus the travel of the piston 52 is greater than that of the moveable wall 54.

As can be seen in FIG. 3, in which the ram 44 is depicted at maximum elongation, the primary chamber 56 and secondary chamber 66 are then at maximum volume whilst the volume of the intermediate chamber 68 is at its minimum.

The value of the axial movement of the piston 52 with respect to the movable wall 54 varies as a function of the ratio of the respective transverse sections of the intermediate chamber 68 and secondary chamber 66.

In the example embodiment depicted in the figures, the respective cross sections of the intermediate chamber 68 and secondary chamber 66 have been chosen so as to be substantially equal so that a movement of the movable wall 54, with respect to the front radial flange 48, causes a substantially equal movement of the piston 52 with respect to the moveable wall 54 and therefore a substantially double movement of the piston 52 with respect to the front radial flange 58, which is fixed.

As can be seen by comparing the extreme positions of the piston 52, which are depicted respectively in FIGS. 2 and 3, the travel of the piston 52 is substantially equal to twice the axial dimension of the ram 44 in the retracted position.

Compared with a simple ram produced according to the state of the art, the ratio of the travel to the axial size is thus doubled.

The same travel/size ratio could have been achieved by means of a ram with two concentric chambers but such rams do not afford such great speed of operation of the clutch.

This is because, in the ram 44 according to the invention, the speed of the piston 52 is double that of the movable wall 54 because the secondary chamber 66 is supplied not by the primary chamber 56 but by fluid which was already initially contained within the intermediate chamber 68.

For this purpose the body 50 and/or the wall 54 can be provided with a plug, not visible, enabling the chambers 66, 68 to be filled.

According to another aspect of the invention, the inner tube 46 is provided at its rear axial end with an outer radial flange 78 which is an end of travel stop for the piston 52.

In a known manner, a pre-loading helical spring 79 is arranged around the ram 44, between the outer cylindrical body 50 and the ball bearing 42, in order to continuously force the bearing 42 against the radial fingers 40 of the diaphragm 18. Thus the bearing 42 is always in contact with the diaphragm 18.

Finally, a sealing bellows 80 is arranged, around the ram 44 and spring 79, between the cylindrical body 50 and the clutch engagement bearing 42, so as to prevent impurities interfering with the sliding of the piston 52 with respect to the shell 64, and the sliding of the shell 64 with respect to the cylindrical body 50.

The ram 44 according to the invention, with its guide tube 46, its outer cylindrical body 50, its movable wall 54 and its piston 52, is able to form, with the bearing 42, the pre-loading spring 79 and the bellows 80, an independent sub-assembly able to be mounted on the gearbox 21 independently of the clutch proper.

This is because, before mounting of the ram 44 on its fixed part, here the casing of the gearbox, the pre-loading spring 79 forces the piston 52 in the direction of the end-of-travel stop 78 and the body 50 in contact with the flange 48 of the inner tube 46.

It will be noted that the front face of the body 50 is recessed for housing the flange 48 on the tube 46 and that a sealing joint is interposed between the body 46 and flange 48. The outer periphery of the flange 48 enables the body 50 to be centred. This body 50 has lugs (not visible) for fixing it to the casing of the gearbox, so that, after mounting, the flange 48 on the tube 46 is gripped between the body 50 and the casing of the gearbox.

The tube 46 is thinner than the body 50, whilst being axially longer than it. This makes it possible to reduce the radial dimension of the ram 44 of the concentric type.

Naturally it is possible to fix the flange 48 on the tube 46 to the front wall of the body 50 by screwing, or as a variant by crimping. As a variant the flange 48 can be attached sealingly to the body 50 and tube 46. In all cases the tube 46 is advantageously distinct from the body 50, which makes it possible to produce the said body easily, notably the transverse base 70 and the channel 50 provided with an inclined part, all this in order to reduce the axial dimension of the ram 44. The bearing 42 has sheet metal rings.

Here it is the inner ring of the ball bearing 42 which is profiled so as to act at one point on the inner end 40 of the fingers 34 of the diaphragm. The outer ring of the bearing is provided with an inner radial flange directed towards the axial axis of symmetry of the ram 44 in order to bear on the piston 52 and an outer radial flange directed in the opposite direction to the said axis to support the pre-loading spring 79, and for mounting the bellows 80 by nesting.

An axially acting elastic washer 2 is mounted in a groove formed at the free end of the piston 52 in order to force the inner flange of the outer ring of the bearing 42 in contact with a shoulder on the piston 52.

Naturally this elastic washer 2, here of the Belleville washer type, with at its inner periphery inclined lugs mounted in the said groove of the piston 52, exerts on the said inner flange a load greater than that exerted by the pre-loading spring on the outer flange of the outer ring of the bearing 42 in order to form the aforementioned sub-assembly.

The bearing 42 is therefore of the maintained self-centring type, a radial clearance existing between the said inner flange and the outer periphery opposite the said inner flange.

As a variant the bearing can be force-fitted on the piston 52.

One of the rings of the bearing 42 can be made in one piece with the piston 52 so that the bearing 42 is not necessarily of the self-centring type.

Naturally the structures can be reversed, the outer ring then being rotating in order to cooperate with the diaphragm and the inner ring fixed whilst being provided with the said inner and outer flanges.

Naturally the piston 52 is provided at the front with a joint 174 for making the secondary chamber fluidtight. This joint, integral with the piston 52, has two lips for respectively cooperating with the outer periphery of the tube 46 and the inner periphery of the shell 64.

Centrally this joint 174 has a stud for cooperating with the movable wall 54 in the position in FIG. 2 and limiting noises.

The movable wall 52 has O-ring seals 163 at its outer and inner peripheries, for cooperation respectively with the internal bore of the body 50 and the outer periphery of the tube 46. Thus, in combination with the joint 74, the chambers 56, 66, 68 are fluidtight.

As is obviously clear from the description and the drawings the intermediate chamber 68 forms a reservoir which surrounds the secondary chamber 66. These chambers 66, 68 are of axial orientation just like the cylindrical internal bore of the outer cylindrical body 50 of tubular shape overall.

The annular wall 54 is of transverse orientation. The outer body 50 and inner tube 46 are mounted in reverse orientations since the rear transverse flange 70 extends radially towards the axial axis of symmetry of the ramp 44, whilst the front radial flange 48 extends radially in the direction opposite to the said axis. The stop 78, instead of being in one piece with the tube 46, can be attached for example by snapping onto the tube 46, then having a groove for receiving notched lugs which the stop has on its inner periphery. The clutch release bearing 42 carried by the piston 52 can be simply bearing thereon.

What is claimed is:

1. A fluid-pressure ram, for controlling a clutch release bearing of an automobile clutch, including a piston, an axially oriented cylindrical shell, a movable annular wall, having on its rear face turned towards the piston a first annular portion and a second annular portion, both concentric, and cylindrical, annular and coaxial chambers, namely two variable-volume control chambers which follow each other axially and comprise on the one hand a primary chamber supplied with pressurised fluid for controlling the movement of the piston from front to rear and which is axially delimited sealingly, to the front, by a fixed base and to the rear by the said movable wall and on the other hand a secondary chamber which is axially delimited sealingly, to the front, by the first annular portion of the rear face of the said movable wall and to the rear by the piston, and an intermediate chamber arranged coaxially around the secondary chamber and sealingly delimited to the front by the second annular portion of the rear face of the said movable wall, the said secondary chamber and the said intermediate chamber being separated radially by the axially oriented cylindrical shell, the said piston sliding inside the secondary chamber, wherein the primary control chamber is delimited radially by two axially oriented fixed cylindrical walls, respectively inner and outer, in that the intermediate chamber is axially delimited at the rear by a fixed annular transverse base, in that the said shell slides axially with the said movable wall and includes a front area connecting with the said movable wall which separates the two annular concentric portions of the rear face of the movable wall and which is provided with passages to permit the decantation of the fluid between the intermediate chamber and the secondary chamber, so that movements of the fluidtight movable wall bring about variations in volume in the fluidtight intermediate chamber so that an increase in the volume of the primary chamber brings about a reduction in the volume of the intermediate chamber connected to the secondary chamber so that the movements of the movable wall bring about a decantation of the fluid from the intermediate chamber to the secondary chamber, and vice versa.

2. The ram of claim 1, having, coaxially, an inner tube whose outer cylindrical wall delimits radially towards the inside the primary and secondary chambers, and an axially oriented outer cylindrical body with a cylindrical internal bore which delimits radially towards the outside the primary chamber and the intermediate chamber, the movable annular wall sliding sealingly between the inner tube and the outer cylindrical body.

3. The ram of claim 2, wherein the front transverse wall of the primary chamber is produced in one piece with the inner tube.

4. The ram of claim 3, wherein the rear transverse base of the intermediate chamber is produced in one piece with the outer cylindrical body.

5. The ram of claim 2, wherein the piston is annular and slides axially on the inner tube and inside the secondary chamber, and bears against a clutch engagement bearing, the movements of which it controls.

6. The ram of claim 2, wherein the inner tube has at its rear axial end a radial flange which constitutes an end-of-travel stop for controlling the piston.

7. A hydraulically controlled clutch release bearing for an automobile diaphragm clutch, wherein the movements of the bearing are controlled by a ram, including a piston, an axially oriented cylindrical shell, a movable annular wall, having on its rear face turned towards the piston a first annular portion and a second annular portion, both concentric, and cylindrical, annular and coaxial chambers, namely two variable-volume control chambers which follow each other axially and comprise on the one hand a primary chamber supplied with pressurised fluid for controlling the movement of the piston from front to rear and which is axially delimited sealingly, to the front, by a fixed base and to the rear by the said movable wall and on the other hand a secondary chamber which is axially delimited sealingly, to the front, by the first annular portion of the rear face of the said movable wall and to the rear by the piston, and an intermediate chamber arranged coaxially around the secondary chamber and sealingly delimited to the front by the second annular portion of the rear face of the said movable wall, the said secondary chamber and the said intermediate chamber being separated radially by the axially oriented cylindrical shell, the said piston sliding inside the secondary chamber, characterised in that the primary control chamber is delimited radially by two axially oriented fixed cylindrical walls, respectively inner and outer, in that the intermediate chamber is axially delimited at the rear by a fixed annular transverse base, in that the said shell slides axially with the said movable wall and includes a front area connecting with the said movable wall which separates the two annular concentric portions of the rear face of the movable wall and which is provided with passages to permit the decantation of the fluid between the intermediate chamber and the secondary chamber, so that movements of the fluidtight movable wall bring about variations in volume in the fluidtight intermediate chamber so that an increase in the volume of the primary chamber brings about a reduction in the volume of the intermediate chamber connected to the secondary chamber so that the movements of the movable wall bring about a decantation of the fluid from the intermediate chamber to the secondary chamber, and vice versa.

* * * * *